United States Patent [19]

Igarashi et al.

[11] 3,905,240

[45] Sept. 16, 1975

[54] PILOT INSULATOR FOR DETECTING DEGREE OF CONTAMINATION THEREOF

[75] Inventors: Hiroshi Igarashi, Nagoya; Toshiyuki Kawaguchi, Inuyama; Kenji Sakanishi, Inazawa, all of Japan

[73] Assignee: NGK Insulators Ltd., Nagoya, Japan

[22] Filed: May 24, 1973

[21] Appl. No.: 363,617

[30] Foreign Application Priority Data
June 7, 1972   Japan.............................. 47-55960

[52] U.S. Cl.............................................. 73/432 SD
[51] Int. Cl.² ........................................ G01N 33/00
[58] Field of Search ........ 73/432 SD, 432 R, 170 R, 73/28; 324/54

[56] References Cited
UNITED STATES PATENTS
1,515,864   9/1924   Lapp...................................... 324/54
2,802,176   8/1957   Anderson............................... 324/54

*Primary Examiner*—S. Clement Swisher
*Assistant Examiner*—Denis E. Corr

[57] ABSTRACT

A pilot insulator for detecting a degree of contamination thereof comprising a portion having a known exposed surface area whose degree of contamination is to be measured and means for supporting said portion and made integral therewith to form an assembled body whose configuration as a whole is substantially the same as that of insulators used in practice whereby said portion is removed from said assembled body to submit said portion thus removed for measurement of the degree of contamination thereof. The measured results thus obtained may determine the opportunity at which measures for the maintenance of the insulators used in practice such as cleaning, washing, etc., can be taken.

10 Claims, 3 Drawing Figures

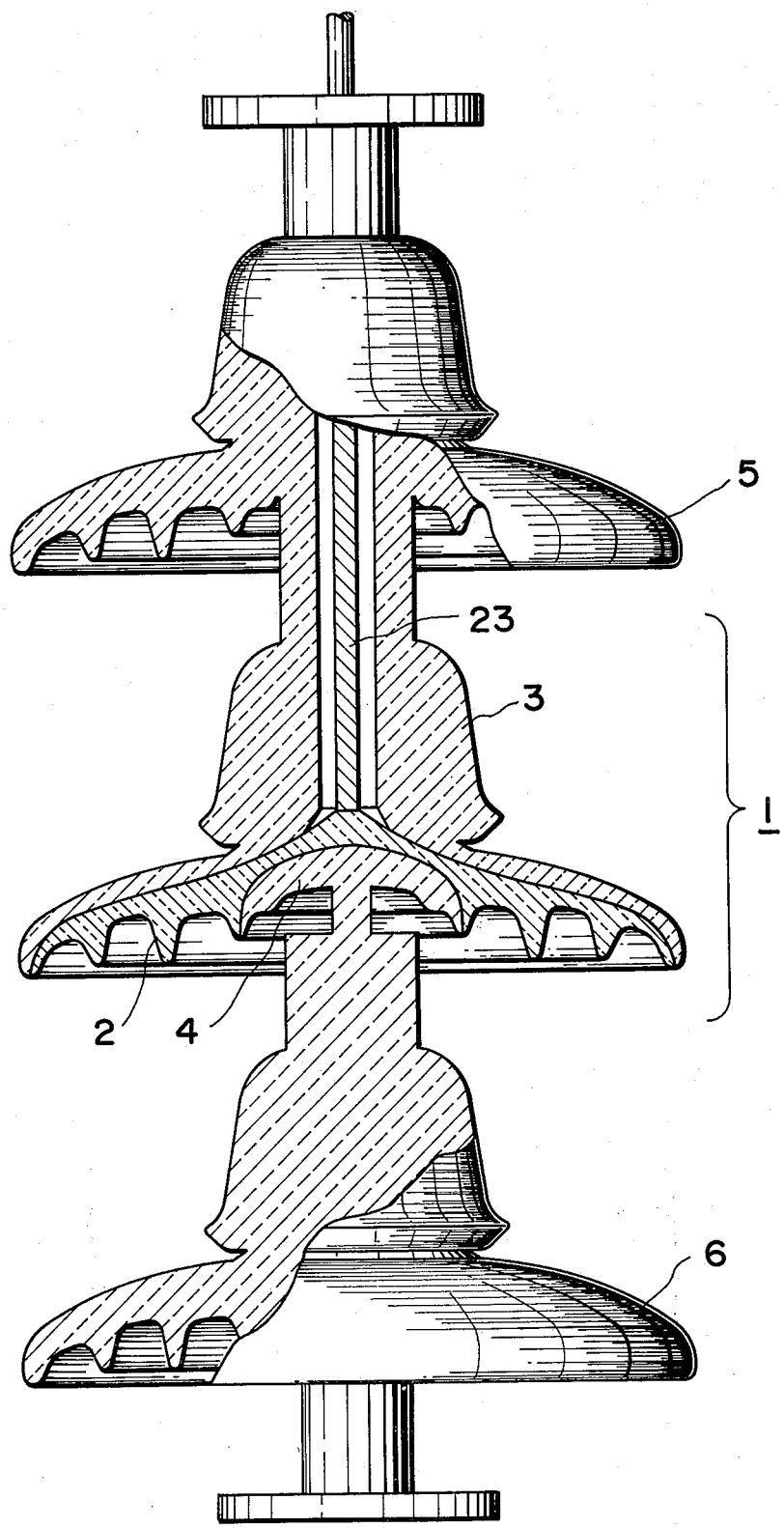

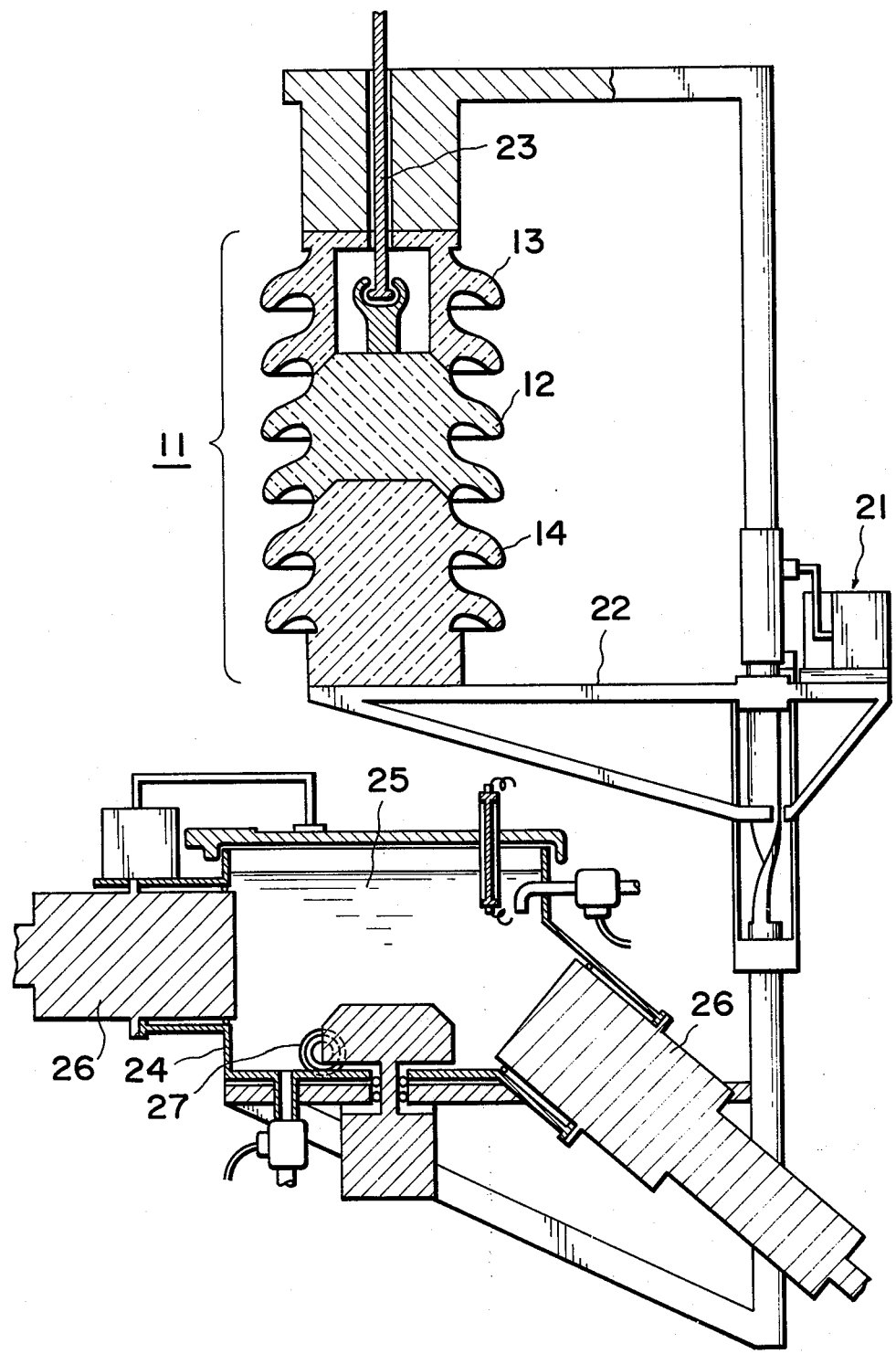
FIG_2

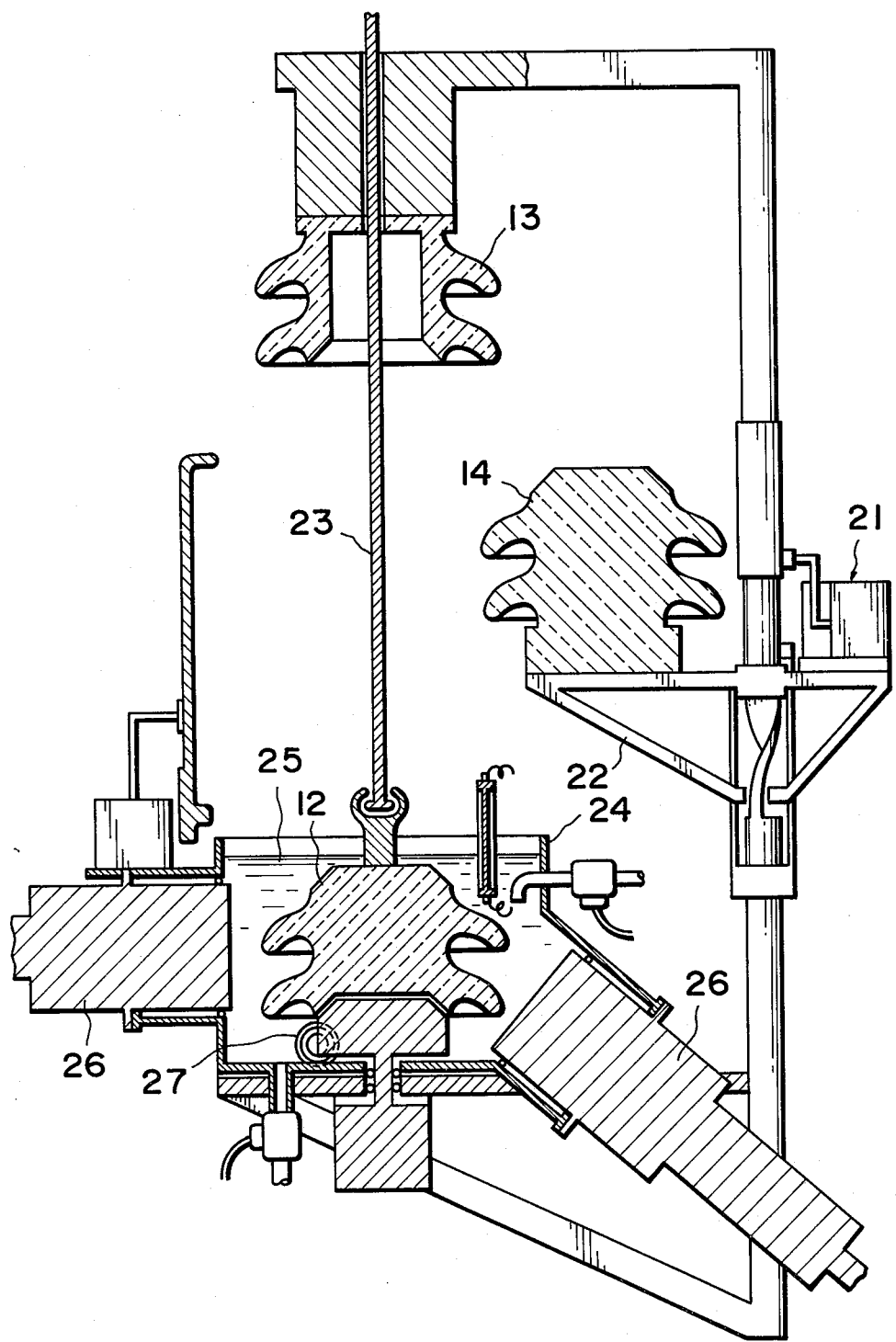
FIG_3

3,905,240

PILOT INSULATOR FOR DETECTING DEGREE OF CONTAMINATION THEREOF

BACKGROUND OF THE INVENTION

1. Field of the Invention

This invention relates to a insulator for pilot purpose and more particularly to a pilot insulator for detecting a degree of contaimination thereof by exposing to an atmosphere under substantially the same condition as that subjected to the insulators used in practice to determine the opportunity at which measures for the maintenance of the insulators used in practice such as cleaning, washing, etc., can be taken.

2. Description of the Prior Art

Heretofore, it has been the common practice to presume the degree of contamination of the insulators used in practice from a chemical analysis or electrical measurement value of a water solution containing salt, dust and/or dirt wiped out clearly from the surface of a pilot insulator exposed to an atmosphere under substantially the same condition as insulators used in practice by a water containing brush, absorbent cotton or gauze. The degree of contamination thus presumed from the measurement subjected to the pilot insulator, however, should substantially be the same as that of the insulators used in practice. In addition, the flash-over voltage of the insulators used in practice under its wet contaminated state is dependent on the density of salt, dust and/or dirt particularly electrolyte deposited thereon. In order to detect that density of the electrolyte deposited on the insulators used in practice which is substantially the same as the real density thereof with the aid of the pilot insulator, it is required to wipe out clearly the salt, dust and/or dirt deposited on that portion of the pilot insulator which is known in its surface area. In practice, however, it has been impossible to wipe out the salt, dust and/or dirt clearly from a certain exposed surface whose area is known. It has also been proposed to cool the pilot insulator to condense moisture in the atmosphere upon the surface thereof or apply a fine spray of water to the pilot insulator and then measure the surface leakage current flowing through that surface portion of the pilot insulator on which is deposited the salt, dust and/or dirt thus presuming the degree of contamination of insulators used in practice. Such method, however, does not directly extract the salt, dust and/or dirt deposited on the pilot insulator, but indirectly measure the degree of such salt, dust and/or dirt. Additionally, it is difficult to make the wet surface condition of the pilot insulator always constant by means of the outside atmosphere such as weather condition, etc. The use of such measuring method has the disadvantage that it would excessively increase an error in measurement.

SUMMARY OF THE INVENTION

The pilot insulator according to the invention can reduce the error in measurement resulted from the use of the above mentioned conventional pilot insulator as small as possible. The pilot insulator according to the invention comprises a portion having a known exposed surface area whose degree of contamination is to be measured and means for supporting said portion and made integral therewith to form an assembled body whose configuration as a whole is substantially the same as that of insulators used in practice whereby said portion is removed from said assembled body to submit said portion thus removed for measurement of the degree of contamination thereof.

The object of the invention is to provide a pilot insulator which can accurately and rapidly detect the degree of contamination thereof and with which a series of measures for the maintenance of the insulators used in practice such as cleaning, washing, etc., can be automated.

BRIEF DESCRIPTION OF THE DRAWINGS

FIG. 1 is a partial cross-section through a disc-type pilot insulator according to the invention;

FIG. 2 is a partial cross-section through a post-type pilot insulator according to the invention for use with an apparatus for measuring a degree of contamination thereof; and FIG. 3 is the same partial cross-section as FIG. 2 in the measuring state.

PREFERRED EMBODIMENT OF THE INVENTION

In FIG. 1 is shown a disc-type pilot insulator embodying the invention. The pilot insulator 1 has a configuration which is substantially the same as that of insulators used in practice and comprises a portion 2 having a known exposed surface area whose degree of contamination is to be measured and means for supporting the portion 2. The supporting means consists of an upper supporting means 3 for holding the portion 2 downward and a lower supporting means 4 for holding the portion 2 upward.

In the embodiment shown in FIG. 1, the pilot insulator 1 is provided on its top and beneath its base with insulator shaped members 5 and 6, respectively, and made integral with the pilot insulator 1 to form an assembled body whose configuration is substantially the same as that of insulators used in practice.

The supporting means 3, 4 are made closely contact with the known exposed surface area portion 2 by subjecting these contact surfaces to grinding, etc. A packing, etc., may eventually be sandwiched between these contact surfaces to prevent the salt, dust and/or dirt from being introduced into these gaps formed between these contact surfaces.

The pilot insulator may be made of any suitable material, but may preferably be made of such material that the salt, dust and/or dirt can be deposited thereon in a state which is substantially the same as in the case of the insulators used in practice. Insulators used in practice and exposed in the atmosphere are mostly made of porcelain so that it is optimum to use a pilot insulator made of porcelain. Alternatively, the pilot insulator may be made of rust proof metal, enamel, glass lining, etc.

The use of the pilot insulator having substantially the same configuration as the insulators used in practice and exposed in the atmosphere under substantially the same condition as the insulators used in practice according to the invention results in considerable operational advantage that an operator can remove the known exposed surface area portion 2 from the supporting means 3, 4 and transfer the portion 2 thus removed to a washing tank where the salt, dust and/or dirt deposited on the exposed surface are washed away and the water containing the salt, dust and/or dirt can be subjected to a chemical analysis or an electrical measurement whereby the degree of contamination of the pilot insulator is detected. Thus, a degree of contamination of the insulators used in practice can be exactly presumed from that of the pilot insulator.

The pilot insulator according to the invention plays the most important role that the salt, dust and/or dirt deposited on the portion 2 are washed away therefrom, that its degree of contamination is measured and that the measured results thus obtained may be used to automate the washing of the insulators used in practice, that is, the operation of a insulator washing apparatus provided around the insulators used in practice and installed outside a substation, etc., may be automated.

In FIG. 2 is shown a post-type pilot insulator according to the invention disposed on an apparatus for automatically measuring its degree of contamination and exposed in the atomosphere under substantially the same conditions as the insulators used in practice. If it is desired to measure the degree of contamination of the pilot insulator 11, a driving means 21 is operated to move downward and rotate a carriage 22 together with a lower supporting means 14 secured to the carriage 22. Then, a hanging rod 23 secured at its lower end to a portion having known exposed surface area 12 is moved downward to immerse the known exposed surface area portion 12 into a liquid 25 in a washing tank 24 as shown in FIG. 3. Then, the known exposed surface area portion 12 is washed, for example, by the ultrasonic vibrations caused by ultrasonic vibrators 26.

The ionization degree of the washing liquid containing the salt, dust and/or dirt deposited on the known exposed surface area portion 12 of the pilot insulator is measured by electrodes 27 of a conductivity meter. The ionization degree thus measured enables an indication of the degree of contamination of the known exposed surface area 12 to be simply obtained.

The degree of contamination exceeding a given value makes it possible to automatically operate an insulator washing apparatus surrounding the insulators used in practice.

Any suitable washing liquid may be used in dependence with the kind of the salt, dust and/or dirt deposited on the known exposed surface area portion 12, but in most cases water may preferably be used as the washing liquid. In addition, the known exposed surface area portion 12 may also be washed by jet stream of water or by agitation with the aid of water stream as well as by ultrasonic vibrations.

As described above, the pilot insulator for detecting the degree of contamination thereof according to the invention makes it possible to remove its known exposed surface area portion 2 or 12 therefrom and wash the portion thus removed in the washing liquid subjected, for example, to ultrasonic vibrations. As a result, it is possible to directly obtain the liquid containing the salt, dust and/or dirt deposited on the portion 2 or 12 without necessitating any skill of the operator and accurately measure the degree of contamination thereof in a simple and rapid manner. Accordingly, the degree of contamination of the insulators used in practice can reliably be ascertained and any measure for maintenance such as cleaning, washing, etc., can be applied at a suitable time, and these series of operations can be automated. Thus, the invention provides the important advantage that the flashover caused by the salt, dust and/or dirt deposited on the insulators used in practice can considerably be reduced. Therefore, the invention contributes greatly to the industry.

What is claimed is:

1. A combination comprising a pilot insulator and insulator-shaped bodies for detecting a degree of contamination thereof comprising a removable portion of said pilot insulator having a known exposed surface area said portion in combination with an upper and lower support forming an assembled pilot insulator whose configuration is substantially the same as that of insulators used in practice.

2. A pilot insulator as claimed in claim 1, wherein said assembled body has a configuration which is substantially the same as that of a disc-type insulator.

3. A pilot insulator as claimed in claim 1, wherein said assembled body has a configuration which is substantially the same as that of a post-type insulator.

4. A method for detecting a degree of contamination of insulators comprising utilizing a pilot insulator which has no insulating function in use with a portion having a known exposed surface area whose degree of contamination is to be measured and upper and lower support means integral therewith to form an assembled body whose configuration as a whole is substantially the same as that of insulators used in practice, the method comprises removing the portion from the assembled body and submitting the portion thus removed for measurement of the degree of contamination thereof.

5. A method as claimed in claim 4, wherein the assembled body has a configuration which is substantially the same as that of a disc-type insulator.

6. A method as claimed in claim 4, wherein the assembled body has a configuration which is substantially the same as that of a post-type insulator.

7. A method as claimed in claim 4, wherein the measurement comprises washing the portion thus removed by washing liquid and detecting a degree of contamination of washing liquid.

8. A method as claimed in claim 7, wherein the washing is effected by ultrasonic vibrations.

9. A method as claimed in claim 7, wherein the detecting is effected by chemical analysis of the washing liquid.

10. A method as claimed in claim 7, wherein the detecting is effected by measuring an electrical conductivity of the washing liquid.

* * * * *